US011768834B1

(12) United States Patent
Amberden

(10) Patent No.: US 11,768,834 B1
(45) Date of Patent: Sep. 26, 2023

(54) STORING AND QUERYING GENERAL DATA TYPE DOCUMENTS IN SQL RELATIONAL DATABASES

(71) Applicant: NEWDAY DATABASE TECHNOLOGY, INC., San Jose, CA (US)

(72) Inventor: Bruce Amberden, Walnut Creek, CA (US)

(73) Assignee: NEWDAY DATABASE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/311,827

(22) Filed: May 3, 2023

(51) Int. Cl.
| | |
|---|---|
| *G06F 16/22* | (2019.01) |
| *G06F 16/2453* | (2019.01) |
| *G06F 16/2455* | (2019.01) |
| *G06F 16/248* | (2019.01) |
| *G06F 16/25* | (2019.01) |

(52) U.S. Cl.
CPC ...... *G06F 16/2456* (2019.01); *G06F 16/2272* (2019.01); *G06F 16/248* (2019.01); *G06F 16/24537* (2019.01); *G06F 16/24544* (2019.01); *G06F 16/258* (2019.01)

(58) Field of Classification Search
CPC ............. G06F 16/2456; G06F 16/2272; G06F 16/24537; G06F 16/24544; G06F 16/248; G06F 16/258
See application file for complete search history.

(56) References Cited

U.S. PATENT DOCUMENTS

| | | | | |
|---|---|---|---|---|
| 6,604,100 B1 * | 8/2003 | Fernandez | ............ | G06F 16/258 |
| 6,785,673 B1 * | 8/2004 | Fernandez | ............ | G06F 40/143 |
| 6,832,219 B2 * | 12/2004 | Lal | ........................ | G06F 16/86 |
| 10,552,443 B1 * | 2/2020 | Wu | ....................... | G06F 16/258 |
| 10,691,682 B2 | 6/2020 | LeGault et al. | | |
| 10,769,209 B1 * | 9/2020 | Saliba | ..................... | G06F 16/86 |
| 11,269,859 B1 * | 3/2022 | Luedtke | ................ | G06F 16/245 |
| 11,514,054 B1 * | 11/2022 | Borthwick | .......... | G06F 16/9024 |

(Continued)

OTHER PUBLICATIONS

Liu et al., JSON Data Management—Supporting Schema-less Development in RDBMS, Jun. 22-27, 2014, SIGMOD/PODS'14, ACM, pp. 1247-1258 (Year: 2014).*

(Continued)

*Primary Examiner* — Jorge A Casanova
(74) *Attorney, Agent, or Firm* — Stephen E. Zweig

(57) ABSTRACT

Many types of data files can only be stored in SQL databases as Blobs—Binary Large Objects, that the database can only handle as a whole. This limits searches within the Blob. Here improved methods are taught for automatically analyzing potential Blob files, and assigning at least certain classes of potential Blob files to General Data Type documents. In some cases, the potential Blob may be automatically analyzed and mapped to a JSON document type, and this JSON document type then automatically mapped into appropriate lists of JSON-document-nodes and tables that can be stored in the SQL database, and subsequently queried. This enables much data within the (to prior art) Blob to be queried at more detailed granularity. This data can then be retrieved and used to reconstruct some or all of the original General Data Type document, which would otherwise be a Blob to prior art methods.

20 Claims, 5 Drawing Sheets

(56) References Cited

U.S. PATENT DOCUMENTS

| | | | | |
|---|---|---|---|---|
| 11,645,285 | B2* | 5/2023 | Gillespie | G06F 16/835 707/769 |
| 2002/0099687 | A1* | 7/2002 | Krishnaprasad | G06F 16/284 |
| 2003/0177481 | A1* | 9/2003 | Amaru | G06F 16/25 717/148 |
| 2005/0289125 | A1* | 12/2005 | Liu | G06F 16/2448 |
| 2006/0031233 | A1* | 2/2006 | Liu | G06F 40/143 |
| 2014/0280047 | A1* | 9/2014 | Shukla | G06F 16/24554 707/769 |
| 2019/0340291 | A1* | 11/2019 | Raman | G06F 16/184 |
| 2021/0081389 | A1* | 3/2021 | Liu | G06F 16/244 |
| 2022/0229840 | A1* | 7/2022 | Mouleeswaran | G06F 16/24537 |

OTHER PUBLICATIONS

ANSI American National Standards Institute, "The SQL Standard—ISO/IEC 9075:2016 (ANSI X3.135)", https://blog.ansi.org/2018/10/sql-standard-iso-iec-9075-2016-ansi-x3-135/#gref, downloaded May 3, 2023.

Emca international, Standard EMCA-404, 1st Edition/Oct. 2013, https://www.ecma-international.org/wp-content/uploads/ECMA-404_1st_edition_october_2013.pdf, downloaded May 3, 2023.

Microsoft/Simplify-DocX https://github.com/microsoft/Simplify-Docx, downloaded May 3, 2023.

Modesty/pdf2json https://github.com/modesty/pdf2json, downloaded May 3, 2023.

Internet Engineering Task Force (IETF) Request for Comments: 8259, https://www.rfc-editor.org/rfc/pdfrfc/rfc8259.txt.pdf, downloaded May 3, 2023.

* cited by examiner ns. STORING AND QUERYING GENERAL DATA
TYPE DOCUMENTS IN SQL RELATIONAL
DATABASES

BACKGROUND OF THE INVENTION

Field of the Invention

This invention is in the field of SQL relational database management systems and structured data formats, such as the JSON format.

Description of the Related Art

Relational databases, such as Structured Query Language (SQL) databases, are widely used in computer science for creating, storing, and retrieving data. SQL databases were first standardized by the American National Standards Institute (ANSI) in 1986, and are exemplified by ANSI SQL standard—ISO/IEC 9075:2016 (ANSI X3.135) and other standards.

A big advantage of SQL methods is that such techniques provide powerful methods for accessing and manipulating structured data. Although powerful, however SQL methods are known to have certain limitations.

Traditional SQL database applications tend to be most effective for data records storable in relational tables—like animated spreadsheets. Unfortunately, not all business data is relational, indeed relational data can sometimes be only a small fraction of the available data. Other types of data include document, graph, or key-value data that does not easily fit into relational tables. Although SQL databases can store such data, they can't analyze this data well. Instead, the traditional SQL approach is to save such documents (and other non-relational) data as 'blob' fields in relational table columns. Blobs (large binary objects) can hold massive amounts of data in a binary format, but the drawback is that blob data is stored as a single entity. Blobs can be a useful method to handle complex files that can't otherwise be decomposed and stored as multiple entities distributed over a plurality of regular database fields. This method can be viewed as a method of last resort when the database system has no other way to parse or understand the data in question.

The SQL database can still store and retrieve these "blobs", often by tagging the blob with additional data fields located outside of the blob itself, but the data inside the blob is otherwise hidden or inaccessible to the SQL database. This means that traditional RDBMSs cannot easily search through large amounts of available data.
JSON Data Formats:

JavaScript Object Notation (JSON) is a standard, language independent, file format originally derived from JavaScript. JSON is covered by international standards ECMA-404 and ISO/IEC 21778:2017, RFC 8259, and other standards. JSON methods, are particularly useful for creating terse, human-readable text, sometimes called JSON document trees, useful for electronic data exchange between different types of software systems and devices.
Using SQL Methods to Store JSON Document Trees:

In some situations, it is useful to store and retrieve JSON documents using SQL methods. Prior art in this area includes LeGault, U.S. Pat. No. 10,691,682, the entire contents of which are incorporated herein by reference.
Converting Other File Formats to JSON Formats Methods to convert other file formats to JSON formats are known in the art. For example, Github.com teaches microsoft/Simplify-Docx code, which teaches software methods to simply standard document .docx files down to components that can in turn be converted to a human readable JSON file. Similarly, Github.com also teaches modesty/PDF2json code, which teaches software methods to convert PDF binaries to text-based JSON documents. Such tools are also available for many other file formats as well.

BRIEF SUMMARY OF THE INVENTION

The invention is based, in part, on the insight that the interior contents of 'blobs' are inaccessible to prior-art SQL queries. As a result, SQL methods to store and retrieve data from 'blob' content are at best complex, difficult to use, and extract a huge penalty in performance.

The invention is also based, in part, on the insight that what is needed are improved methods that can effectively store and query document and semi-structured data in existing SQL relational databases without the use of blobs, or at least minimizing the use of blobs.

This invention is also based, in part, on the insight that the JSON document data type may be used for storing and querying a broader class of General Data Type documents (GDTD) in SQL RDBs. The JSON-document-node format is a good model for this purpose, because it deploys a modified version of the JSON array-object path from the JavaScript programming language—providing a powerful new query target for retrieving simple and complex JSON document structures and content.

Further, in some embodiments, JSON methods can be used as an intermediate step for the processor mediated process of storing and retrieving General Data Type documents (GDTD) from SQL RDBs. That is, in at least some embodiments, the process data flow may be: GDTD to JSON to SQL RDB, as well as (in reverse) SQL RDB to JSON to GDTD. That is, the JSON document data type may be used as an intermediate step in the blob to SQL analysis process. This allows an otherwise hard to handle GDTD blob to first be analyzed and translated into a JSON document, and the translated JSON document can then be stored in the SQL RDB. The process can work in reverse, in which the SQL RDB is queried, appropriate JSON document(s) extracted, and the extracted JSON document(s) then translated into the appropriate GDTD blob(s). The net effect is to expose the data and structure inside the GDTD "blob" to more precise analysis using the SQL RDB.

In some embodiments, the invention may be a system or method to natively store General Data Type Documents (GDTD) in SQL-relational databases (SQL RDBs) as sets of General Data Type (GDT) GDT-document-node records. In particular, systems and methods for deriving GDT Relational Schemas that define a relational format for GDT-document-nodes, as well as matching definitions for GDT relational tables to store GDT-document-node records, are taught.

As will be discussed, the invention will also teach methods to convert JSON documents into lists of JSON-document-nodes, methods to generate SQL queries to write JSON-document-node records into JSON relational tables, methods to generate queries to retrieve JSON-document-node records from the SQL RDBs, and methods to restore JSON-document-nodes back into JSON documents. These methods may be generalized to further teach more general methods to natively store other types of document data, such as GDT document data, in SQL RDBs.

DETAILED DESCRIPTION OF THE INVENTION

Figure 1:
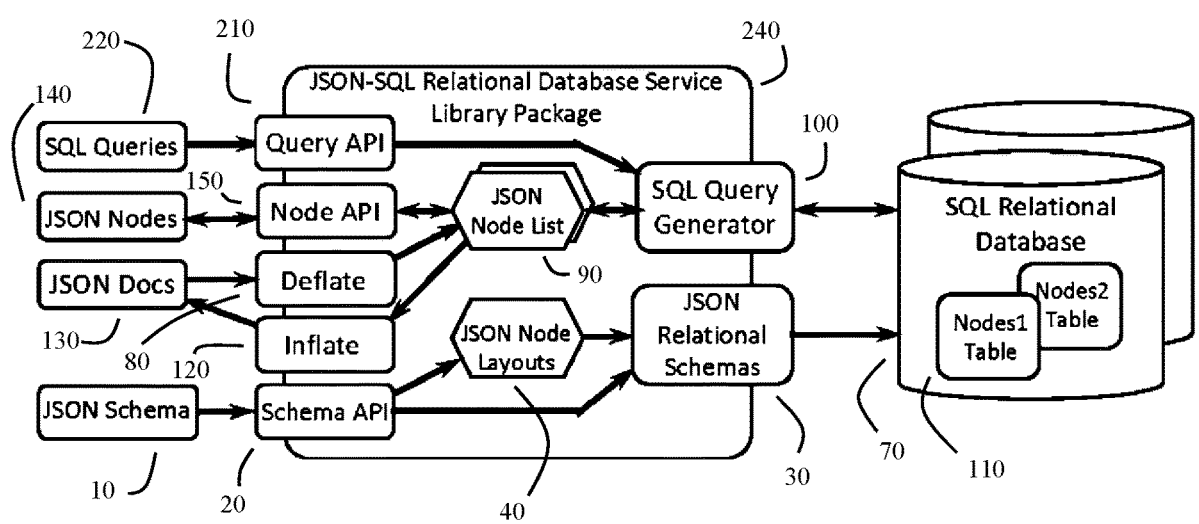
FIG. 1 shows various functional modules implemented by JSON-SQL Relational Database Services Library packages software for writing/storing/querying JSON Documents/ Data in SQL relational databases.

Before going into the detailed description of the invention, applicant believes that additional discussion is in order.

The invention is based on the insight that it is useful to apply the existing data storage capabilities of open-source and commercial SQL (Structured Query Language) Relational Database products to natively store a wide assortment of document and semi-structured graph and key-value data. These systems and methods thus teach how to render document and semi-structured data into relational forms (normally suitable for storage only as blobs) storable in SQL relational databases in a more useful form without materially modifying these SQL relational databases.

Here the term "document and semi-structured data" will occasionally be abbreviated as "blob-data." However, it should be understood that the invention does not apply to all types of blobs. Rather, it applies to the specific set of document and semi-structured data that can be analyzed according to the methods described herein.

The commercial utility of the invention is due to the fact that the invention's improved ability to store document and semi-structured data (blob data) in SQL relational databases makes this formerly-hard-to-analyze data now accessible to the full power of the SQL relational query algebra.

As previously discussed, many of the examples herein will be based on the JSON (JavaScript Object Notation) document data format. The JSON document data format was selected to illustrate the effectiveness of these methods rendering most, if not all, document and semi-structured data formats appropriately for storage in SQL relational databases. Further, the JSON document data embodiment is exceptionally effective and useful for saving and querying JSON document data in SQL Relational Databases. Additionally, as previously discussed, this technique can further use the JSON methods as an important intermediate step in handling otherwise difficult to analyze GDTD documents.

To generalize, many document and semi-structured data formats, including the JSON data format, can be viewed, according to the invention, as belonging to a larger set of General Data Types (GDTs). These GDT type blobs are all composed from text—written words as opposed to the pixels, sounds, video, or time type blobs not covered herein.

This disclosure relies on the insight that that those general data type (GDT) formats based on text—written words—may be converted (either with or without loss of information or content) for storage in SQL Relational Databases. This conversion process can optionally use JSON techniques as an intermediate step in the process. In addition to the specific JSON document type subset of GDT formats, other methods to handle non-JSON GDT will also be discussed.

The present disclosure teaches the following methods:

First, this disclosure extends to a larger set of GDT documents, which includes, among many others, the JSON data format. Indeed, in some embodiments, the methods disclosed herein may extend to the full set of GDT documents.

Second, this disclosure introduces GTD Relational Schemas as a structured approach for defining GTD-prepared Relational Database (RDB) tables and GDT-document-node records.

Third, according to this disclosure RDB tables able to hold GDT-document-node records may now have multiple alternate implementations as needed to meet evolving business application requirements.

Fourth, in some embodiments, this disclosure replaces the RDB table primary key path field in the prior art JSON-document-node record format with a newly defined JSON document node path field. GTD structural paths can accomplish the same objective for all GTD documents. GDT structural paths can also specify how the GDT-document-nodes attach to their parent GDT document's root node. The methods disclosed herein can fully separate and isolates GDT (and JSON) data from RDB table primary key entanglements— GDT (and JSON) document structures stored in RDB tables need no longer depend on any restricting RDB features; rather, GDT (and JSON) documents may now be entirely self-contained and independent of RDB limitations.

Fifth, this approach for storing document data in SQL RDBs teaches additional ways to perform joins between GDT (and JSON) documents using simple SQL join-select queries.

Sixth, this approach applies to GDT document data generally extending the reach of the new GDT (and JSON) Relational Schemas to configure SQL relational databases even further.

In some embodiments, the methods taught herein can deliver a new capability to write GDT document data natively into SQL relational databases, thus making it possible to retrieve that GDT document data using standard SQL queries. Natively means that documents may rendered (either directly, or using a JSON intermediate) into lists of relational data records that can be written into standard SQL relational tables. This invention enables SQL relational databases to apply the full power of the SQL relational query algebra to retrieve and reassemble enormous sets of relational document data back into complex documents (again either directly, or using a JSON intermediate). This invention develops and deploys new document-style relational schemas to configure SQL relational databases to store document and semi-structured data—GDT document data.

In some embodiments, the invention may be viewed as teaching a system or method of storing and retrieving at least portions (and often the entirety of) of General Data Type Documents (GDTD) using Structured Query Language (SQL) Relational Databases (SQL-RDB). This method uses at least one GDTD (GDT document) formatted according to a General Data Type (GDT). This General Data Type (GDT)

can in turn comprise any of JavaScript Object Notation (JSON) document data types, markup language document data types, and text document data types. Other suitable document data types can include XMIL, HTML, YAML (YAML Ain't Markup Language), and all other markup-style documents, graph and key-value documents; PDF, docx, CSV (Comma Separated Values), and spreadsheet documents; plus, all plain text documents like the Encyclopedia Britannica, the US Constitution, Shakespeare Sonnets and Plays, almost all books, and much more. The set of General Data Types (GDT) include almost all data type documents based on text—based on written language. Both graph and key-value document data, no matter what form or language they are expressed in, are directly convertible to the JSON format, and are easily converted into GDT-document-node records for storage RDB tables. Even certain video types such as Lottie video types can also be handled. This embodiment makes all this data (information and knowledge) fully accessible, searchable, and joinable to SQL queries.

The reason this invention is possible is that all text-based, written language based, document data has an inherent internal tree structure accessible to these conversion methods. These methods take advantage of the inherent tree structure to convert text-based data into GDT-document-node records for storage in SQL relational databases. One could now search for connections between the US Constitution and Shakespeare in a properly setup, prepared, and data-loaded SQL RDB. These methods can only support imagery, video, audio, and time-series data using AI tools, like the chatGPT, to analyze and render the contents of these data types into text descriptions and captions which are accessible to these methods and therefore storable in SQL RDBs.

These General Data Type Documents (GDTDs) are typically stand-alone, self-contained, single data set instance that conforms to at least one of these GDT types discussed above. An important aspect is that for at least some of the GDT, a GDT relational schema that specifies how to transform that GDTD into at least one list of GDT-document-nodes and corresponding GTD-document-node records suitable for storage in data tables of the SQL-RDB is either known to the system, or can be automatically identified by the system.

These GDT-document-nodes generally comprise tuples composed of GDT-structure fields and GDT-content-value fields. The GDT-structure fields specify how to assemble lists of these GDT-document-nodes back into at least portions of the original GDTD.

The method operates by selecting, using at least one computer processor and computer memory, at least one GDT relational schema specifying a mapping between the one or more GDTD and at least one SQL-RDB. This GDT relational schema is then used to convert the GDTD into a corresponding list of GDT-document-node records for insertion into matching schema-defined SQL-RDB tables.

According to the invention, data can be retrieved by generating and executing SQL select queries or SQL general join-select queries to search for specific sets of GDT-document-node records or joined GDT-document-node records in these specific SQL-RDB tables. The SQL database will then return those selected GDT-document-node records from those SQL-RDB tables that match the SQL select query or the SQL general join-select queries. The invention then reassembles these GDT-document-node records into at least portions of the (original) GDTD by using the GDT-document-node records to assemble these selected GDT-document-node records back into at least portions of the matching GDTD.

About the GDTD Internal Structure:

The invention operates with at least those GDTD that have an internal structure comprising either a document data type with a tree-hierarchical structure or a semi-structured data type with graph, key-value, or other structure like lists, arrays, maps, sets, stacks, queues, hashes, matrices, and many more. The GDT-document-nodes typically further comprise a GDT-structure field, one or more GDT-content-value fields, and zero or more other extended application data fields.

Here, the GDT-structure field specifies how a given child GDT-document-node attaches to its parent GDTD. Further, the GDT-structure field has a syntax that is configured to be an SQL query condition target selected to enable searching for GDT-document-node records by GDT document structure. This allows the SQL database to search inside the GDT document, which generally is not possible for prior art blob methods.

The GDT-content-value fields specify GTD-document-node content values. These GDT-content-value fields are typically comprised of structural values comprising any of arrays, lists, objects, and other structural values; note that other data types of structural values may also be used, such as binary trees, heaps, graphs, maps, sets, stacks, queues, hashes, matrices, linked-lists, and so many more. The GDT-content-value fields can further comprise non-structural scalar values comprising any of, but not limited to, strings, numbers, Booleans, integers, reals, floating point numbers, fixed point numbers, pointers, datetimes, coordinates, colors, enumerations, and other scalar values including anything in the real world that may be measured where the measure may be reduced to a fixed data value. These structural values specify the GDTD internal structure variations. By contrast, the non-structural scalar values capture at least some GDTD content value data types. In some embodiments, the scalar values will capture all of the GDTD content value.

Because in some embodiments, the disclosures taught herein may use JSON methods as an intermediate between the GDTD documents and the SQL RDB, many of the specific examples taught herein are based on the JSON document data format (which is one of the General Data Type document formats.)

This invention may be viewed as comprising an analytic process (1), sets of methods (2), and their embodiments (3). Here these are described in more detail.

1) Analytic Process

The analytic process makes it possible to create GDT Relational Schemas for installing GDT-prepared relational tables into SQL RDBs. GDT Relational Schemas are produced by analyzing GTD Document data formats. Although this process can use an intermediate GDTD- to JSON step, followed by a JSON to SQL RDB process, other methods may also be used, and are not disclaimed.

In some embodiments, GDT document related database tables are installed in SQL RDBs by executing GDT Relational Schema documents in the SQL RDBs. This analytic process works on most, if not all GDT document data; but in this instance, the analytical process is being applied to the JSON Document data format. The analytic process examines JSON document content and structure to extract the essential JSON document structure from which to create JSON relational schema documents. When executed in any SQL RDB, JSON relational schema documents will install JSON relational tables able to store JSON document data rendered into relational form. GDT Relational Schemas are the first major component of this invention.

2) Sets of Methods

The various sets of methods described herein define algorithms required to create and manage GDT relational schemas, and apply them to install GDT relational tables into SQL RDBs. These include methods to render GDT documents into lists of relational GDT data nodes for insertion into GDT relational tables; methods to inflate GDT nodes retrieved via SQL select queries from GDT relational tables back into GDT documents; and query methods to update and delete GDT nodes and documents in/from GDT relational tables. Other GDTD to JSON and JSON to GDTD conversion methods may also be used.

The objective of these sets of methods is to mechanize the process of rendering—in this embodiment—of JSON documents into lists of relational data records that can be written into standard SQL relational tables making the JSON data records query-able via standard SQL queries. The sets of methods include methods for deflating JSON documents into relational data records, inflating JSON relational data records back into JSON documents, generating SQL insert queries from sets of JSON relational data records, generating SQL update and delete SQL queries, plus simple and join SQL select queries, then methods for executing those queries against targeted SQL relational databases. Also included are methods implementing the Analytic Process for composing GDT (and JSON) Relational Schema documents, methods for managing and executing these schema documents in SQL relational databases, plus methods for managing, copying, and deleting the resulting document relational tables in the SQL Relational Database. These methods are a second major component of this invention.

In some embodiments, the GDT relational schema may use a matching GDT-document-node definition to specify the GDT-document-node record and the matching SQL-RDB tables that can hold that GDT-document-node record.

Here, for example, the GDT-document-node record can comprise one non-null integer primary key ID field, one or more GDT-structure fields, one or more GDT-content-value fields, plus zero or more extended application data fields; (It should be noted that in some embodiments, the GDT-document node and the GDT-document-node records may be only different by one field. The GDT document node record may have a non-null integer primary key ID field that the GDT-document node doesn't).

In some embodiments, the GDT relational schema comprises at least one or more SQL create table statements that, when executed creates one or more GDT relational live tables in a target SQL-RDB instance configured to store the schema defined GDT-document-node records. Here a target SQL-RDB product can be any open source or commercial SQL Relational Database, such as SQLite3, PostgreSQL, MySQL, Oracle, DB2, MS SQL Server, and the like.

In some embodiments, the GDT relational schema further comprises at least one (e.g., one or more) SQL create index statements that defines one or more indexes on each defined/created GDT relational live tables. Here, the GDT relational schema may be written/implemented in an SQL dialect of the target SQL RDB instance, which executes a specific GDT relational schema to install one or more live tables and indexes able to store GDT-document-node records.

Once created, the one or more live SQL RDB tables may be searched via SQL select and join-select queries to retrieve sets of GDT-document-node records using both GDT-structure fields and GDT-content-value fields as search condition targets.

Note that in some embodiments, the search-condition-target means that the search-condition-target is used in SQL queries as searchable content to match/find GDT-document-node records; where 'target SQL RDB' means the specific SQL RDB product that the GDT relational schema is intended to work on. Each GDT relational schema only works on ONE SQL RDB product and each different SQL RDB product requires a different specific GDT relational schema written specifically for that TARGET SQL RDB product.

Figure 3:
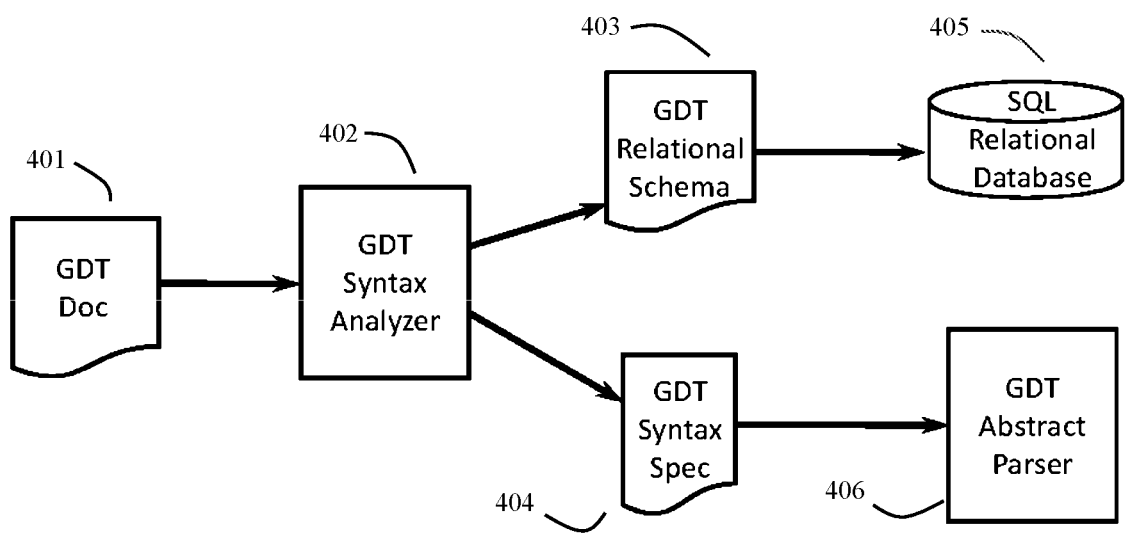
FIG. 3 shows how the General Data Type documents are analyzed by a GDT Syntax Analyzer to generate GDT Relational Schemas able to prepare SQL RDB tables to hold GDT-document-node records, and to generate a GDT Syntax Spec to setup a GDT Abstract Parser able to convert GDT documents into lists of GDT-document-nodes.
Figure 4:
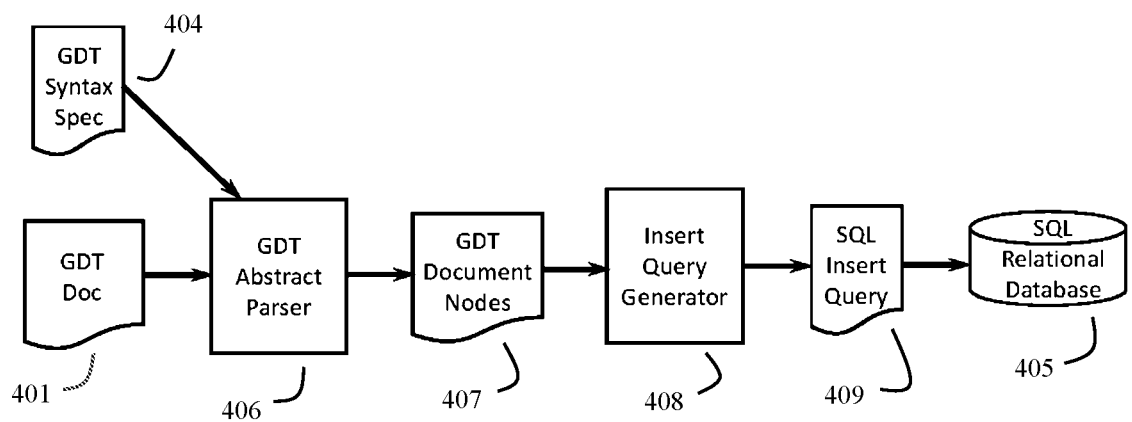
FIG. 4 shows parsing and converting General Data Type documents into lists of GDT-document-nodes which are passed to an Insert Query Generator to generate an SQL Insert Query that is executed in a prepared SQL RDB to insert GDT-document-node records into a matching RDB table (or tables).

As will be further discussed in FIG. 3 and FIG. 4, in some embodiments, the method further comprises reading the GDTD; and automatically converting these GDTD into a set of GDT-document-node records. These GDT-documents node records can then be used to generate SQL insert statements to insert-write GDT-document-node records into the specific matching SQL-RDB table(s).

The invention may further comprise various additional methods, including any of:

Receiving and executing a GDT relational schema document in a specified target SQL RDB to install one or more GDT relational tables in a specified SQL RDB product.

Receiving input parameters which direct loading of a specified SQL RDB instance for use, or removal of a specified SQL RDB instance from use.

Receiving input parameters directing the generation of appropriate SQL query statements to delete specified RDB tables and their GDT-document-node record content from the specified SQL RDB instance.

Receiving input parameters directing the generation of appropriate SQL query statements to copy specified RDB tables and their GDT-document-node record content from a specified source SQL RDB instance to a specified target SQL RDB instance.

Receiving input parameters directing the generation of appropriate SQL query statements to copy specified GDT-document-node records from a specified source RDB tables in the specified source SQL RDB instance to specified target RDB tables in a specified target SQL RDB instance.

Receiving, parsing, and converting GDT documents into lists of GDT-document-node records as defined by their matching GDT relational schema.

Receiving input parameters and lists of GDT-document-nodes, directing the generation of appropriate SQL insert query statements that when executed by the specified SQL RDB instance will insert the list of GDT-document-nodes as GDT-document-node records into the specified RDB table in the specified SQL RDB instance.

Receiving input search parameters directing the generation of appropriate SQL select query or join-select query statements that when executed by the specified SQL RDB will retrieve a list of GDT-document-node records from the specified RDB tables in the specified SQL RDB instance.

Transforming lists of GDT-document-node records retrieved from the specified RDB tables in the specified SQL RDB instance into one or more output GDT documents.

Receiving input parameters and a list of GDT-document-nodes directing the generation of appropriate SQL update query statements that when executed by the specified SQL RDB instance will modify existing GDT-document-node records in the specified RDB table in the specified SQL RDB instance.

Receiving input parameters directing the generation of appropriate SQL delete query statements that when executed by a specified SQL RDB instance will delete existing GDT-document-node records form the specified RDB table in the specified SQL RDB instance.

3) Embodiments

In some embodiments, the systems and methods taught herein may rely upon, and implement, software products including 1) a software library package (GDT-SQL Relational Database Service Library) that provides a set of GDT Document APIs for SQL RDBs, and 2) a software management application product (GDT-SQL Relational Database Management Application) to manage the overall integrated GDT Document API with SQL RDB system.

In these embodiments, the software libraries can implement the methods described/listed in section (2) above; and the management application integrates the software libraries with additional methods (described in section (2) above) and SQL RDBs. The library packages and management application, which may be written in software that implements the required GDT document processing methods and required SQL query methods, run on real physical computer hardware, and interfaces/connects to real SQL RDBs that also run on real physical computer hardware.

This computer hardware will typically comprise at least one processor, computer memory, network interfaces to networks such as the internet, and the like. Often the real physical computer hardware will further comprise at least one computer server, and at least one client computerized device, often communicating with the at least one computer server using the network and network interface.

The integrated system typically writes (via insert queries) GDT (and JSON) documents into SQL RDBs, and retrieves (via select queries) GDT (and JSON) documents from SQL RDBs. The system may further do any GDTD to JSON and JSON to GDTD translations as needed.

In some embodiments, the invention may implement the analytic process and the sets of methods as software libraries and application products that operate with real SQL RDBs and run on real physical computers and servers. The first set of methods are combined into a GDT-SQL Database Service Library package which provides a GDT Document API to connect commercial and open-source applications with GDT-SQL RDBs to read and write GDT Documents. Multiple such GDT-SQL Relational Database Service Library packages are required—one for each combination of a preferred programming language and chosen SQL RDB product. The GDT-SQL Relational Database Management Application product provides methods for composing GDT Relational Schema documents and then executing those documents in targeted SQL RDBs; plus managing the resulting GDT relational tables. These two software products are the third major component of this invention.

Observe that although the analytic process, methods, and embodiment disclosed by this invention patent applies generally (with simple specializations) to nearly all document-style data formats including plain text documents and semi-structured data—GDT document data—this embodiment selects the JSON Document data format as the first instance of implementation both to demonstrate capability and operability, and because the JSON Document data format can often be a useful intermediate step for other GDTD in any event. The special case of the JSON Document data format serves to demonstrate the system's capability, which can be applicable to nearly all other GDT document types.

Invention Goals and Aspects

In some embodiments, the methods disclosed herein may be used to add the capability required to write GDT document data natively into SQL RDBs. This therefore making that data accessible to retrieval via standard SQL queries. This invention can also enable SQL RDBs to apply the full power of the SQL relational query algebra to retrieve and reassemble sets of relational data back into complex GDT documents.

In some embodiments, the methods disclosed herein may use the JSON Document data format, implements software modules in the JavaScript programming language, and target SQL-RDB such as the open-source SQLite3 relational database. Other commercial or open-source SQL RDB product may also be used. However, SQLite3, an open source, public domain SQL database, will occasionally be cited as a specific example. This is available online at sqlite.org.

As previously discussed, the methods disclosed herein may be understood as having three main components. Again, these are the analytic process (1), sets of methods (2), and their embodiment (3) in software that runs on physical computer hardware. These components are discussed below in more detail.

1) Analytic Process

In some embodiments, it may possible to identify a GDT relational schema that specifies how to transform the GDTD into at least one list of GDT-document-nodes and corresponding GTD-document-node records by any of:

examining a file extension type of the GDTD, and obtaining a GDT relational schema from memory that corresponds to the file extension type; and/or examining, using any of pattern recognition methods, statistical analysis, or artificial intelligence, the internal structure of the GDTD, and determining if a GDT relational schema from memory corresponds to the internal structure; and/or examining, using artificial intelligence methods, the internal structure of the GDTD, and generating an AI obtained GDT relational schema that fits the internal structure.

Here, an automated syntax parser can extract both structure and content based on token and syntax hints—and an AI would help optimize the syntax discovery. An automated or AI parser can also produce an abstract syntax tree which holds GDT nodes. This can produce both the GDT relational schema and a parser specification to convert GDTDs into GDT-document-nodes. The GDT relational schema can be loaded into an SQL RDB. The GDT parser spec can be executed by a parser to configure the parser to convert GDT documents into GDT-document-nodes. This process is not unlike the methods done by programming language compilers using compiler-compiler tools It may also be possible to use a library of GDTD to JSON conversion algorithms, select the appropriate GTDT to JSON conversion algorithm using methods discussed above, and do a preliminary step of converting the GDTD information to an equivalent set of JSON documentation.

Additionally, in some embodiments, the system may further use the GDT relational schema to convert the GDTD into a corresponding list of GDT-document-node records for insertion into matching schema-defined SQL-RDB tables; reading the GDTD by at least emulating a document reading or editing program that operates according to the GDT relational schema, and extracting information from the GDTD to obtain the corresponding list of GDT document node records.

In some embodiments, the GDT relational schema may be read by a parser program as a specification to configure the parser to read documents of this GDT and generate lists of GDT-document-nodes. In this embodiment, the process that creates the GDT relational schema also generates a specification for a syntax-configurable parser to convert GDTDs into lists of GDT-document-nodes.

The GDT relational schema document is also directly executable in the target SQL RDB product to setup the correct tables to hold GDT-document-node records—to prepare the SQL RDB to hold GDT documents.

In other cases, similar or alternative methods may be advisable, such as those disclosed below.

As previously discussed, this invention is based on some general insights, that when combined, can deliver a new approach for saving and querying JSON document data in SQL RDBs. These insights help to implement JSON relational schemas. JSON relational schemas are SQL relational schemas that specify the structure—not the content—of JSON document data in relational form. Note, each different GDT document type will often require a specific GDT document relational schema tailored to that GDT document's data format and the targeted SQL RDB. JSON relational schemas are documents executed in targeted SQL RDBs to install JSON relational tables able to store JSON-document-nodes in relational form. Some of these analytic steps are shown below:

Step 1.1. Analyze typical JSON documents to explore and understand JSON content data type and structure specifications. The JSON data format has six data types: 2 structural types: arrays and objects; and 4 scalar content types: string, number, Boolean, and null. The structural types, arrays and objects give JSON data the ability to be structured into hierarchical document trees. JSON documents are composed of nested arrays and objects. It is important to notice/recognize that the array and object types have similar implicit/explicit layouts that allow them to use the same document node form.

Step 1.1.1. Search for an underlying data structure common to both JavaScript/JSON arrays and objects. In JavaScript, arrays have the form:

```
let a = ["one", "two",      // an array a with four string elements.
"three", "four"];
a[1] ==> "one"              // array index 1 selects the value "one".
a[2] ==> "two"              // array index selects the matching value.
 . . .                      // arrays are composed from index-value pairs
( index, value )            // implicit array structure
```

In JavaScript, objects have the form:

```
Let b= { "one": 1, "two":2,  // an object b with four entries.
"three":4, "four":4 };
b.one ==> 1                  // object key "one" selects value 1
b.two ==> 2                  // object key selects the matching value
 . . .                       // objects are composed of key-value
pairs
( key, value )               // explicit object structure
```

In JavaScript and JSON arrays and objects have a similar underlying common data structure:

(index-key, value); where indexes are numbers, and keys are strings.

The (index-key, value) defines a tuple: <index-key, value>; which can be applied to create the JSON relational value>; which can be applied to create the JSON relational schema, where 'index-key' can be a number or string (both valid JSON types) and the value can be any of the six JSON types: array, object, string, number, Boolean, or null.

Step 1.1.2. This tuple may be expanded into a relational data record schema suitable for defining a relational table. What's needed is the addition of a simple autoincrementing integer primary key like so:

<index-key, value>=><pkey, index-key, value>

Where pkey is the primary key, index-key is a number or string, and value is one of the six JSON types. The data record schema is now ready to define a JSON node table for an SQL relational database.

Step 1.1.3. Define a JSON node table schema for an SQL relational database based on the JSON data record schema. The new relational table will hold JSON document data node records that match the JSON data record schema. The following relational table create statements, when executed in an SQL relational database, will create a JSON node relational table:

```
drop table if exists nodes;
create table nodes {
   pkey        integer      not null primary key autoincrement,
   index_key   numeric      default "",
   value       numeric      default "",
}
create index nodes_index_key_index on nodes(index_key);
create index nodes_value_index on nodes(value);
```

In the SQLite3 open-source RDB, the numeric type is able to hold both numbers and strings. However, other SQL RDBs without the numeric type may require up to four separate values (string_val,integer_val,real_val, boolean_val) to capture all six of the JSON data types. This relational create table statement, the drop table statement, and two following create index statements are part of the JSON relational schema. Nodes tables enable SQL RDBs to store JSON data nodes (JSON-document-node records). This relational table schema is enough to create at least an SQLite3 compatible JSON relational schema document, but modifications may be needed for other SQL RDB.

Step 1.1.4. JSON relational schema documents are executed by SQL RDBs to install JSON node tables and other resources into the SQL RDB. An SQL RDB with JSON node tables becomes a JSON-SQL RDB. A simple select query is all it takes to retrieve JSON data nodes from the database:

select * from nodes;

This select query retrieves all JSON data nodes from the nodes table. Select queries can retrieve JSON node data, but there is no way, yet, to put the retrieved JSON nodes back into the original JSON document tree structure. Knowledge of a JSON document's tree structure is required to reassemble JSON nodes back into the original JSON document.

Step 1.2. This second analytic process step is required to discover how to capture the hierarchical tree structure of JSON documents. Revisit the analysis of typical a JSON document focusing this step on exploring and understanding JSON document structure. JSON documents are hierarchical trees of arrays and objects, where the arrays and objects contain/hold JSON values that may include other arrays and objects. From another viewpoint, JSON documents are hierarchical trees of JSON nodes. JSON documents have three kinds of JSON nodes: root, interior, and leaf, where there is only one root node and multiple interior and leaf nodes. Root node values almost always hold an object; interior node values may only be arrays or objects; leaf node values may be any of the six JSON value types. The following is an annotated JSON document example:

```
1.    {                              <== root node: name this node root, type is object
2.        "name": "frog",            <== leaf node: node name is name, type is string
3         "type": "amphibian",       <== leaf node; node name is type, type is string
4.        "kind": " treefrog",       <== leaf node; node name is kind, type is string
5 .       "note": [                  <== interior node: node name is note, type is array
6            "frogs eat bugs.",      <== leaf node: node index is 0, type is string
7.           "frogs hop very fast.", <== leaf node: node index is 1, type is string
8         ],
9.        "about": {,                <== interior node: node name is about, type is object
10.          "say": "frogs say errp",<== leaf node: node name is say, type is string
11.          "legs": 4,              <== leaf node: node name is legs, type is number
12.          "tail": null,           <== leaf node: node name is tail, type is null
13.       },
14.       "alive": true              <== leaf node: node name is alive, type is boolean
15.   }
```

This JSON document example has one root node, two interior nodes, and 9 leaf nodes.

Step 1.2.1. The path from the root of a JSON document to an interior or leaf node is how that node is attached to its parent JSON document. This path is the JSON path, a string list of key-names and index-numbers in dot-notation. The JSON path in dot-notation captures the structure of JSON documents, how each JSON node in a JSON document is attached to its JSON document root node. From the example JSON document, review the following JSON paths, in dot-notation syntax:

```
root.name         ==> "frog"
root.note.1       ==> "frogs hop very fast."
root.about.legs   ==> 4
```

Each data node in a JSON document has a JSON path attaching it to its parent JSON document root node. JSON paths follow a similar syntax as in JavaScript to reach into deeply nested object/arrays. The difference is that the JavaScript array bracket notation is replaced here with a simpler dot-notation.

Step 1.2.2. Next, the JSON path needs to be added to the JSON node data record schema to capture JSON document hierarchy tree structure—to capture each JSON node's path to its parent JSON document root node. The new JSON node data record schema becomes:

<pkey, index-key, value>=><pkey, path, value>

Where the 'index-key' field is replaced by the JSON path field. This replacement is possible because the 'index-key' index-number or key-name is already on the JSON path as the last element on the path. Keeping the 'index-key' field would be redundant. Of course, the pkey and value remain unchanged.

Step 1.2.3. Now, update the JSON node table schema definition with the new JSON node data record schema; create the new table. This table now enables an SQL RDB to store JSON data nodes that contain their JSON path that specifies how to connect a JSON node to their parent JSON document root node.

```
drop table if exists nodes;
create table nodes {
    pkey    integer         not null primary key autoincrement,
    path    varchar(1024)   default "",
    value   numeric         default "",
}
```

-continued

```
create index nodes_path_index on nodes(path);
create index nodes_value_index on nodes(value);
```

This new JSON nodes table replaces the original nodes table in the JSON relational schema document. This JSON nodes table now includes the JSON path which when passed to an inflation routine, will assemble the selected JSON nodes back into the original JSON document fully intact.

Step 1.2.4. Now the finish of the second step, execute the new JSON relational schema in the target SQL RDB to remove the old JSON node table and install the new. The new JSON-SQL RDB is now fully operational. The same simple select query, as before, will now retrieve JSON data nodes that can be fully inflated back into the original JSON document. The JSON path is an excellent select query where-clause target to extract JSON document sub-trees, or the same sub-tree from thousands of JSON documents. The select query possibilities are powerful and endless, fully able to search JSON nodes by JSON document structure.

The result of this analytic process is to produce, in this instance, JSON Relational Schema documents which are executable in targeted SQL RDBs. SQL RDBs with JSON relational tables become JSON-SQL RDBs. The analytic process is fully generalizable to most GDT document data types. Next are the algorithmic methods.

2) Sets of Methods

As previously discussed, this invention applies algorithm methods to mechanize the analytic process for composing and executing JSON (or GDT) relational schemas in SQL RDBs. Plus, additional algorithm methods are required to mechanize the insertion and retrieval of document data into and from SQL RDBs. In this instance, generalized document methods are specialized to work with JSON documents. These methods and algorithms specify an API for writing JSON document data into SQL RDBs. These methods may be packaged into a JSON version of the GDT-SQL Relational Database Service Library (GDT-SRDSL) software packages.

FIG. 1 shows various functional modules implemented by JSON-SQL Relational Database Services Library packages software for writing/storing/querying JSON Documents/Data in SQL Relational Databases. This figure shows the layout of the functional component modules in a JSON-SQL Relational Database Services Library package, and how the functional modules connect to SQL relational databases and each other. Examples of the data stored by and flowing through each functional module is shown below.

Part 2.1. One method for composing JSON Relational Schemas can be determined once the analytic process is known. The core JSON Document structure is fixed and never changes; and is always based on the simple <path, value>tuple. The JSON Relational Schema is implemented in the SQL language format/syntax specific to the targeted SQL RDB. The only requirement is to generate valid JSON relational schema documents, then load and execute them in target SQL RDBs. See FIG. 1, reference points (10), (20), (30) and (40). These reference points show the flow of JSON relational schema data through the sub-modules in the GDT-SRDSL package module. Schema data (10) can be loaded via the Schema API (20), then split between the JSON Node Layouts (40) and JSON Relational Schemas (30) modules. The JSON Relational schemas module (30) can execute JSON relational schemas in the attached SQL relational database (70) to create JSON relational node tables (110). Reference examples of the typical content in these modules (40) and (30) are shown below:

Example of the Content of (40):
  JSON Data Node Layout
  <pkey, path, value>
Example of the Content of the JSON Relational Schemas (30):

```
JSON Relational Schemas
drop table if exists nodes1;
create table nodes1 {
    pkey    integer         not null primary key autoincrement,
    path    varchar(1024)   default "",
    value   numeric         default "",
};
create index nodes1_path_index on nodes1(path);
create index nodes1_value_index on nodes1(value);
```

```
drop table if exists nodes2;
create table nodes2{
    pkey    integer         not null primary key autoincrement,
    path    varchar(1024)   default "",
    value   numeric         default "",
};
create index nodes2_path_index on nodes2(path);
create index nodes2_value_index on nodes2(value);
```

Part 2.2. Methods required for rendering JSON documents into list-arrays of JSON-document-node records include those shown in FIG. 1, reference points (130), (80) and (90).

One algorithm method implements a JSON document parser that scans JSON documents to capture JSON-document-nodes along with their JSON paths to the root node of their JSON document—see FIG. 1, point (80). The result is a list of JSON-document-nodes saved in JSON Node List module—see FIG. 1, point (90) that is used to generate SQL insert statements (FIG. 1, point (100)).

An example JSON-document-node SQL insert statement as generated by the SQL Query Generator that when executed in the target SQL RDB (FIG. 1, point (70)) loads JSON document nodes into the specified JSON node relational table (see FIG. 1, point (110)). Is shown below:

Example of a Generated JSON Insert Query
  insert into nodes1 values
    (1, "root", "{ }"),
    (2, "root.name", "frog"),
    (3, "root.type", "amphibian"),
    (4, "root.kind", "treefrog"),
    (5, "root.note", "[ ]"),
    (6, "root.note.0", "frogs eat bugs."),
    (7, "root.note.1", "frogs hop very fast."),
    (8, "root.about", "{ }"),
    (9, "root.about.say", "frogs say errp"),
    (10, "root.about.legs", 4),
    (11, "root.about.tail", "null"),
    (12, "root.alive", true);

A second algorithm method may be used to inflate JSON-document-nodes back into JSON documents (see FIG. 1, points (120), (130)). This method walks through query-retrieved JSON-document-nodes, in the JSON Node List (FIG. 1, point (90)), carefully reconstructing the original JSON document tree from the JSON paths in the JSON nodes. This process converts lists of JSON-document-nodes that feed into (FIG. 1, point (90)) back into JSON Documents (handled at FIG. 1, point (130)).

Examples of these JSON document nodes and JSON Documents are shown below:

JSON Node List Example
[
  ["root.name", "frog" ],
  ["root.type", "amphibian" ],
  ["root.kind", "treefrog" ],
  ["root.note", "[ ]" ],
  ["root.note.0", "frogs eat bugs." ],
  ["root.note.1", "frogs hop very fast." ],
  ["root.about", "{ }"],
  ["root.about.say", "frogs say errp" ],
  ["root.about.legs", 4],
  ["root.about.tail", "null"
  ["root.alive", "true" ]
]

JSON Document Example
{
  "name": "frog",
  "type": "amphibian",
  "kind": "treefrog",
  "note": [
    "frogs eat bugs.",
    "frogs hop very fast.",
  ],
  "about": {,
    "say": "frogs say errp",
    "legs": 4,
    "tail": null,
  },
  "alive": true
}

The result is an output JSON document (see FIG. 1, point (130)) and the above example JSON document.

Sometimes inflation is not needed because the desired outputs are the JSON-document-nodes themselves (see FIG. 1, point (140), (150), and the example JSON Nodes below).

Example JSON Nodes
[
  ["root", "{ }"],
  ["root.name", "frog"],
  . . .
  ["root.alive", "true"]
]

FIG. 1, the JSON Nodes, JSON Documents, JSON Node List (discussed previously) and the Generated JSON Insert Query (for point 100) and the Nodes1 Table for JSON DATA Node Records for point (110, shown below) show typical example content of the different sub-modules including the JSON Nodes, JSON Documents, a JSON Node List, the content of a JSON Node Table, and an example insert query generated by the SQL Query Generator.

Generated JSON Insert Query Example
insert into nodes1 values
  (1, "root", "{ }"),
  (2, "root.name", "frog"),
  (3, "root.type", "amphibian"),
  (4, "root.kind", "treefrog"),
  (5, "root.note", "[ ]"),
  (6, "root.note.0", "frogs eat bugs."),
  (7, "root.note.1", "frogs hop very fast."),
  (8, "root.about", "{ }"),
  (9, "root.about.say", "frogs say errp"),
  (10, "root.about.legs", 4),
  (11, "root.about.tail", "null"),
  (12, "root.alive", true);
Nodes1 Table:
JSON Data Node Record Example

| |
| --- |
| < 1, root, { } > |
| < 2, root.name, frog > |
| < 3, root.type, amphibian > |
| < 4, root.kind, treefrog > |
| < 5, root.note, [ ] > |
| < 6, root.note.0, frogs eat bugs. > |
| < 7, root.note.1, frogs hop very fast. > |
| < 8, root.about, { } > |
| < 9, root.about.say, frogs say errp > |
| < 10, root.about.legs, 4 > |
| < 11, root.about.tail, null > |
| < 12, root.alive, true > |

Note that the SQL relational database (70) can represent multiple attached SQL Relational Databases with possibly thousands of JSON data node tables.

Part 2.3. Methods are required to generate SQL insert statements from the list-array of JSON document nodes. Insert statements can be very large; many databases allow query strings/text to be larger than 4 gigabytes of text. This enables JSON-document-node insert statements to load thousands of JSON documents at the same time. A single query can load thousands of JSON documents. At the other extreme, insert statements can easily add new JSON-document-node records to JSON documents already stored in the database. The SQL Query Generator (FIG. 1, point (100)) accepts query data input from the Query API (FIG. 1, point (210)) which receives input from external SQL Queries data (FIG. 1, point (220)). An example of such a SQL query is:
SQL Queries
Select * from nodes1

Part 2.4. Multiple methods are required for updating and deleting JSON-document-nodes in and from JSON relational tables. JSON update queries can update one or more JSON-document-nodes in one or more JSON documents simultaneously. Update queries can update paths and values. Updating paths moves JSON-document-nodes to different locations in a JSON document or moves JSON-document-nodes to different JSON Documents. Delete query method algorithms can delete single JSON-document-nodes, sub-trees of JSON-document-nodes, entire JSON documents, or multiple JSON documents. The SQL Query Generator (FIG. 1, point (100)) can accept SQL update and delete queries from external sources (FIG. 1, points (220), (210)) or can generate SQL update and delete queries based on other external input.

Part 2.5. Multiple methods may be used for selecting JSON-document-nodes for reconstructing JSON documents and sub-documents. Select statement methods can select single or multiple JSON-document-nodes from single or multiple JSON documents. Select statements can select sub-trees of JSON-document-nodes from single or multiple JSON document or select entire JSON documents or thousands of JSON documents. All with single select queries. Understanding how JSON paths put JSON-document-nodes and JSON documents together in SQL RDBs, select join queries can assemble 'virtual' JSON documents composed from multiple separate JSON documents into a single output 'actual' JSON document. Methods with select-join clauses make complex join queries easy to apply to JSON-document-nodes. No other database technology, SQL or NoSQL, can do easy reliable document joins. Select queries can be input from external sources, or may be generated on the basis of external data input. See FIG. 1, points (220), (210), (100). Selected JSON-document-node data is output through the JSON Node List (FIG. 1, point (90)) to either the Node API (FIG. 1, point (150)) and then to an output list of JSON Nodes (FIG. 1, point (140). (See an example of output JSON Nodes above). These can also go to the Inflate module (FIG. 1, point (120)) and then to an output JSON document (FIG. 1, point (130). An example of such an output JSON document was previously shown above.

Figure 2:
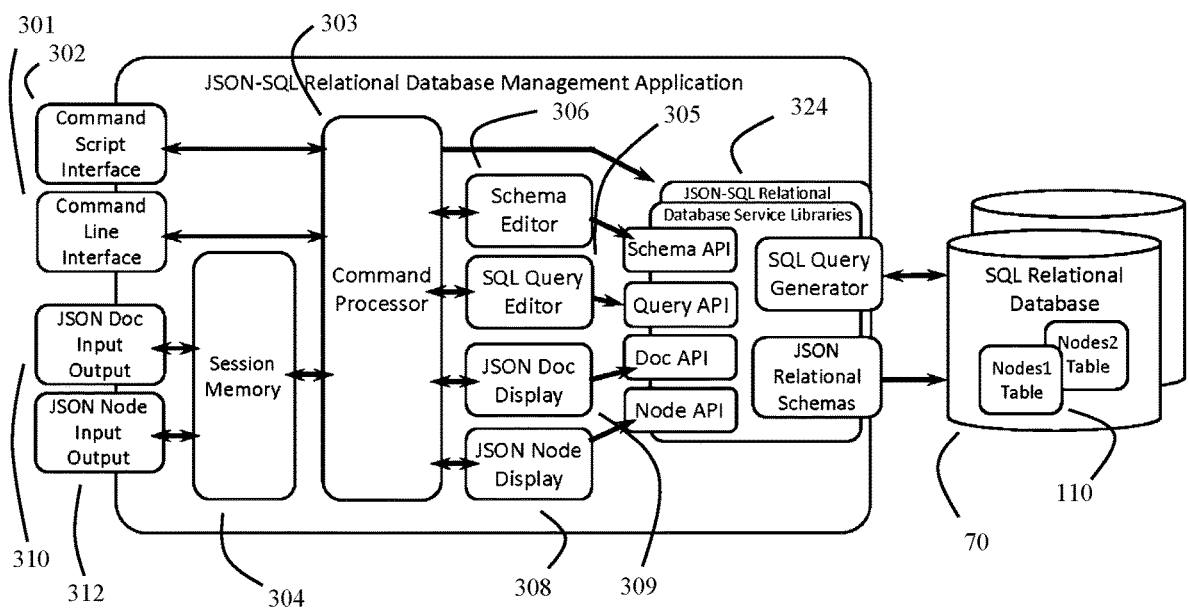
FIG. 2 shows the JSON-SQL Relational Database Management Application connecting to several SQL Relational Databases.

FIG. 2 shows the JSON-SQL Relational Database Management Application connecting to several SQL Relational Databases. A JSON-SQL Relational Database is an SQL Relational Database paired with a matching JSON-SQL Relational Database Services Library. A JSON-SQL Services Library gives connected SQL Relational Databases the capability to store and query JSON Document data. This figure shows some of the primary features of the JSON-SQL Relational Database Management Application.

Part 2.6. Multiple methods may be used for managing, executing, or deleting multiple JSON Relational Schema documents and multiple databases. Other methods in this set manage JSON relational tables, also enabling them to be moved between databases, copied, or deleted; or copy JSON-document-node records between JSON relational tables in the same or other SQL RDBs. These method functions are executed via the Command Line Interface or Command Script Interface (see FIG. 2, points (301), (302)) through the Command Processor (FIG. 2, point (303)). Information related to attached SQL RDBs, JSON relational node tables, JSON Relational Schemas can be held in the Session Memory (FIG. 2, point (304)) and mediated via the Command Processor (FIG. 2, point (303)). Once a JSON relational schema is executed in an SQL relational database, JSON-document-node records may be loaded into the JSON relational tables (FIG. 1, reference points (130), (80), (90), (100), (70), (110)), or JSON nodes may be directly loaded via the Node API (FIG. 1, points (140), (150), (90), (100), (70), (110)).

Note that in some embodiments, the GDT relational schema may reformat at least some of the GDTD data into an intermediate JSON format. Alternatively, or additionally, in some embodiments, the invention may further use JSON formatted data to reassemble the GDT-document-node records into at least portions of the GDTD.

Software and Physical Computer Aspects.

Expressing the invention in a system format, the invention may be viewed as being a system for storing and retrieving at least portions of General Data Type Documents (GDTD) using Structured Query Language (SQL) Relational Databases (SQL-RDB). This system will typically comprise: at least one processor (such as 303) and memory (such as 304). This at least one processor and memory are typically configured to run at least one SQL RDB Management Application (SQL-RDBMA) (70); and this at least one processor is often also configured to obtain at least one GDTD (401) formatted according to a General Data Type (GDT).

As previously discussed, this GDT may comprise any of JavaScript Object Notation (JSON) document data types, markup language document data types, text document data types, and other document data types. This General Data Type Document (GDTD) (401) is typically a stand-alone, self-contained, single data set instance that conforms to at least one of the GDT; as previously discussed, this set of GDT can include XML, HTML, YAML (YAML Ain't Markup Language), and all other markup-style documents, graph and key-value documents; PDF, docx, CSV (Comma Separated Values), and spreadsheet documents; plus, all plain text documents like the Encyclopedia Britannica, the US Constitution, Shakespeare Sonnets and Plays, almost all books, and much more. The set of General Data Types (GDT) include almost all data type documents based on text—based on written language. Both graph and key-value document data, no matter what form or language they are expressed in, are directly convertible to the JSON format, and are easily converted into GDT-document-node records for storage RDB tables.

For at least some of the GDT, the memory (304) further comprises, or the processor (303) is configured to obtain, a GDT relational schema (403) that specifies how to transform the GDTD into at least one list of GDT-document-nodes and corresponding GTD-document-node records (407) suitable for storage in matching schema (403) defined relational tables of the SQL-RDB (405).

These GDT-document-nodes (407) generally comprise tuples composed of GDT-structure fields and GDT-content-value fields. Here, the GDT-structure fields specify how to assemble lists of the GDT-document-nodes back into GDTD. The at least one processor (303) is configured to select at least one GDT relational schema (403) specifying a mapping between at least one the GDTD and at least one the SQL-RDB (405). This at least one processor (303) is configured to use the GDT relational schema (403) to convert the GDTD into a corresponding list of GDT-document-node records (407) for insertion into matching schema-defined SQL-RDB tables.

This at least one processor is also configured to generate and execute SQL select queries (410) or SQL general join-select queries to search for specific sets of GDT-document-node records or joined GDT-document-node records in specific SQL-RDB tables. The at least one processor (303) is also configured to return those selected GDT-document-node records (407) from those SQL-RDB tables that match the SQL select query (410) or SQL general join-select queries. The at least one processor (303) is also configured to reassemble the GDT-document-node records (407) into at least portions of the GDTD by using the GDT-document-node records (407) to assemble (411) the selected GDT-document-node records back into at least portions of matching GDTD (401).

As previously discussed, the at least one the SQL-RDB (70) is often located in one or more memory storage devices in one or more networked computer servers. Thus processor (303) and session memory (304) may be in such a networked computer server or server. The network may be the internet, or other type computer network.

3) Additional Discussion of Various Embodiments

As can be seen from the above discussion, this invention requires real software and physical computer/server embodiments to manifest, realize, implement, demonstrate, and use the ability to write JSON document data into real SQL RDBs and then query that JSON document data from real SQL RDBs (also running on real physical computer servers). This embodiment can implement multiple software components, such as a set of library packages and a management application. The library packages, each a GDT-SQL Relational Database Service Library package, can provide a GDT Document API to connect commercial and open-source applications to SQL RDBs. Multiple service library packages may be required—one for each combination of a preferred programming language and a chosen SQL RDB product. The combination of a service library package with an SQL RDB creates a new instance of a GDT-SQL RDB.

The management application can provide functionality for composing JSON Relational Schemas, executing JSON Relational Schemas in a target SQL RDB; plus managing the resulting JSON Relational Tables. This is the GDT-SQL Relational Database Management Application. In this embodiment instance both software components may be implemented in JavaScript and interfaced to a SQL database such as the SQLite3 Relational Database product.

Part 3.1. The GDT-SQL Relational Database Service Library package can be a JavaScript software package that adds JSON Document APIs to SQL RDBs. Service library packages implement the methods were previously described in the above methods section. There may be multiple service library packages, each optimized and built for a specific programming language to support a specific SQL RDB product (FIGS. 1 & 2, point (70)). Each database product has its own software driver interface, with its own unique connection mechanism, set of unique functions, with its unique SQL query language variant. Nevertheless, through its specific GDT-SQL Relational Database Service Library package (FIG. 1 points (10) and (240)), each SQL RDB product is able to store and query exactly the same JSON document data. Each of the methods described above may be implemented as custom JavaScript software functions in a standard framework, fully able to process JSON Document data into forms suitable for the target SQL RDB product (FIG. 1, step through points (130), (80), (90), (100), (70), (110)). Each GDT-SQL Relational Database Service Library has software functions to connect to the target SQL RDB product (FIG. 1, points (100), (30)); to generate insert, update, delete, and select JSON node queries in the SQL variant of the target SQL RDB (FIG. 1, point (100)); to deflate JSON documents into lists of JSON nodes (FIG. 1, point (80)), inflate JSON nodes into JSON documents (FIG. 1, point (120), to manage lists of JSON nodes (FIG. 1, point (90)); to build, manage, and execute JSON Relational Schemas (FIG. 1, step through points (10), (20), (30), (40)); and to manage, copy, move, and delete JSON relational tables (FIG. 1, point (110)). GDT-SQL Relational Database Service Library packages are the embodiment backbone of GDT-SQL RDB. Third-party application software incorporates specific GDT-SQL Relational Database Service Library packages (FIG. 1, point (240)) to attach and enable their software applications to store and query JSON data in their choice of SQL RDB product.

Part 3.2. The GDT-SQL Relational Database Management Application can enable users to directly interact with and manage GDT-SQL Relational Databases. A GDT-SQL RDB is an SQL RDB product interfaced through a GDT-SQL Relational Database Service Library package making it capable of storing and querying JSON documents in the form of JSON-document-nodes stored in JSON relational tables (FIG. 1, point (240) added to point (70)). This combination attaches a JSON Document API to SQL RDBs. The Management Application embodiment typically has two forms: a Command Line (cli) version, and a WebUI version to deliver a visual interface. Both Management Applications have the full ability to load, store, edit, and execute JSON Relational Schemas (FIG. 2, step through points (301), (302), (303), (304), (306), (324)). Each version of the Management Application has functionality to load, operate on, and close SQL RDB instances (FIG. 2, points (301), (302), (303), with point (324)). The Management Apps may have hundreds of SQL RDB instances open and operational simultaneously. SQL RDB configuration data is stored in Session Memory and managed via the Command Processor (FIG. 2, points (304), (303)). In addition, the Management Apps are built with all available GDT-SQL Relational Database Service Library packages (FIG. 2, point (324)), so they are able to load multiple different vendor database instances simultaneously as well (FIG. 2, point (70)). SQL RDB products are typically implemented as Servers that support multiple instance databases, where each instance database has its own, unique, separate schema and set of tables. The Management Apps have functionality to create, copy, move, or delete JSON relational tables, where move and copy can transfer any database table (plus its content GDT-document-node records) from a source database instance to any other target database instance on any attached and open SQL RDB product (FIG. 2, points (301), (302), combined with points (303), (304), connecting to point (324) and to point (70)). Both Management Apps have a full SQL query editor (FIG. 2, point (305)) with full query execute access to JSON relational tables (FIG. 2, point (110)) and any traditional table that may be resident in a database instance, plus the functionality to show select query results as both a list of JSON-document-nodes or as inflated JSON documents (FIG. 2, points (308), (309)). Both Management Apps have functionality to load external JSON documents and JSON-document-nodes (FIG. 2, points (310), (312)) and insert them into any JSON relational table in any database instance in any attached and open database server (FIG. 2, points (70), (110)). Each Management App has a sizeable JSON-structured session memory (FIG. 2, point (304)) to store JSON documents and nodes for further processing or editing. Session memory may be saved to, or loaded from an external JSON document file (FIG. 2, points (304) and (310))—and the session memory may be set to auto-save upon exit and auto-loaded on startup.

As previously discussed, in other embodiments, other types of document and semi-structured data formats may also be written into SQL RDBs by converting these formats into JSON Document data, and then writing the JSON document data into the SQL RDBs. Data may be extracted by reversing this process.

Syntax Analysis:

In some embodiments, the system or method further comprises using at least one computer processor (303) to read the GDTD (401). This computer processor will then automatically convert the GDTD into a set of GDT-document-node records (407), and then using these GDT-documents node records (407) to generate SQL insert statements (408, 409) to insert-write GDT-document-node records into the specific matching SQL-RDB table(s) (405).

FIG. 3 shows how the General Data Type documents can be analyzed by a GDT Syntax Analyzer to generate GDT Relational Schemas able to prepare SQL RDB tables to hold GDT-document-node records, and to generate a GDT Syntax Spec to setup a GDT Abstract Parser able to convert GDT documents into lists of GDT-document-nodes. Some of these steps are shown below.

(401) shows a GDT Doc: an instance of a General Data Type document.

(402) shows a GDT Syntax Analyzer. This can be a process for analyzing GDT document syntax from which to generate a GDT Relational Schema for execution in an SQL RDB product, and to generate a GDT Syntax Spec that is loaded into a GDT Abstract Parser to enable that parser to parse/convert GDT documents into lists of GDT-document-nodes. This syntax examiner can operate by various methods. For example, in some embodiments, the GDT syntax analyzer can operate by examining the GDTD's file extension type. Alternatively, the GDT syntax examiner can operate by examining, the internal structure of the GDTD using any of pattern recognition methods, statistical analysis, or artificial intelligence. As another example, the GDT syntax analyzer can examine the internal structure of the GDTD using artificial intelligence methods.

(403) shows a GDT Relational Schema: an SQL document that is executed in a specific SQL RDB to install relational tables configured to hold the specified GDT-document-node records. In some embodiments, as previously discussed, this may be done by using information derived from the GDT syntax analyzer to convert the GDTD into intermediate JSON format, and then further converting the intermediate JSON format into the appropriate SQL RDB relational tables.

For example, if the GDT syntax analyzer recognizes the GDTD file extension type, the system can select the appropriate GDT relational schema from memory that corresponds to this file extension type. Here, for example, the system may store a library of various GDTD to JSON conversion algorithms, and use the GDTD file extraction or other GDTD structure recognition process (discussed below) to select the appropriate GTDT to JSON conversion algorithm, and do an intermediate step of converting the GDTD information to an equivalent set of JSON information.

Alternatively, or additionally, if the GTD syntax analyzer uses pattern recognition methods, statistical analysis, or artificial intelligence to determine the internal structure of the GDTD, the system can then determine a suitable GDT relational schema from memory (such as FIG. 2, 304) corresponds to this internal structure. If the GDT syntax analyzer uses artificial intelligence (AI) methods to determine the GDTD's internal structure, then the AI system can also produce an AI obtained GDT relational schema that corresponds to this internal structure.

In some embodiments, the system may further use the GDT relational schema to convert the GDTD into a corresponding list of GDT-document-node records for insertion into matching schema-defined SQL-RDB tables; reading the GDTD by at least emulating a document reading or editing program that operates according to the GDT relational schema, and extracting information from the GDTD to obtain the corresponding list of GDT document node records.

(404) shows a GDT Syntax Spec. This can be a spec document that is loaded into a GDT Abstract Parser to configure that parser to parse/convert specific GDT documents into lists of GDT-document-nodes.

(405) shows the SQL RDB. This can be the SQL RDB system/product which can be one of any type of open-source or commercial SQL Relational Database system/product.

(406) shows a GDT Abstract Parser. This can be a parser-parser process that loads a GDT Syntax Spec that it uses to configure itself to parse/convert specific GDT documents into lists of GDT-document-nodes. This step can also be used in cases when converting the GDTD into a JSON intermediate is not needed or is not appropriate.

FIG. 4 shows parsing and converting General Data Type documents into lists of GDT-document-nodes which are passed to an Insert Query Generator to generate an SQL Insert Query that is executed in a prepared SQL RDB to insert GDT-document-node records into a matching RDB table (or tables).

(401) shows the GDT Doc. As before, this can be an instance of a General Data Type document (GDTD).

(404) shows the GDT Syntax Spec. As previously discussed, this can be a spec document that is loaded into a GDT Abstract Parser to configure that parser to parse/convert specific GDT documents into lists of GDT-document-nodes. As before, in some embodiments, this can use an intermediate JSON format to facilitate this step as desired. That is again, the system can use algorithms either stored in memory, or derived by AI methods, to perform a GDTD to JSON conversion as needed.

406. GDT Abstract Parser: a parser-parser process that load a GDT Syntax Spec that it uses to configure itself to parse/convert specific GDT documents into lists of GDT-document-nodes.

407. GDT Document Nodes: a list of GDT-document-nodes in plain text format.

408. Insert Query Generator: a method/process for converting a list of GDT-document-node into an SQL Insert Statement for execution in the target SQL RDB product.

409. SQL Insert Query: an SQL Insert Query to be executed in the specified SQL RDB product.

405. SQL Relational Database: the SQL RDB product that has already been prepared by executing the specified GDT Relational Schema now able to execute the SQL Insert Query to load GDT-document-node records into SQL RDB table(s).

Figure 5:
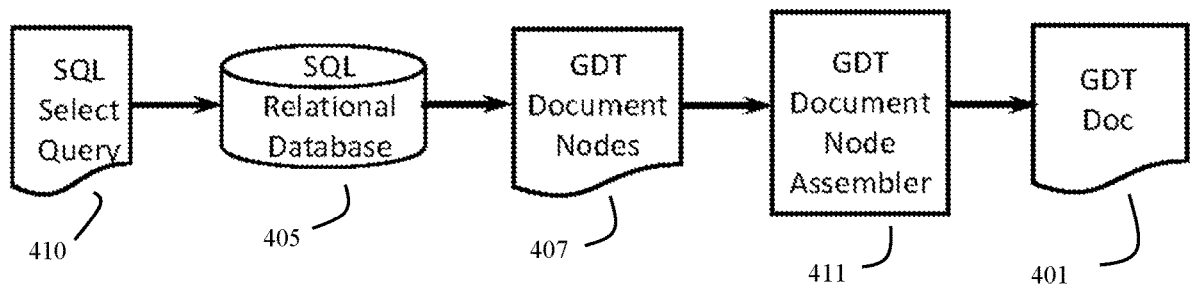
FIG. 5 shows the process of executing an SQL select query in an SQL RDB on tables holding GDT-document-node records, then converting the returned GDT-document-nodes back into a GDT document.

Once the GDTD has been stored in the SQL database, to be useful, the system also needs to eventually retrieve this information in response to specific SQL inquiries, and then reassemble at least parts of the original GDTD in response to this query. Although often, a set containing entire GDTD will be fetched and reassembled, it can be useful to also enable the system to fetch those portions of the original document that are most responsive to that particular SQL inquiry, and to output a set containing partial versions of the GDTD as appropriate. One embodiment of this retrieval process is shown in FIG. 5 below.

It should be noted that in some embodiments, the process of converting the GDT-document-node records may further comprise:

Executing SQL select (410) and/or join-select queries that retrieve sets of GDT-document-node records (407) from the SQL relational database (405).

Automatically converting (411) these sets of GDT-document-node records into the GDTD (401), and then outputting either the GDT-document-node records (407) or the GDTD (401) to external applications or web applications.

And then often displaying either the GDT-document-node records (407) or the GDTD (401) in a GUI user interface. This user interface may, for example, be a bit-mapped display on a user computerized device that interfaces with one or more internet servers such as shown in FIG. 2. The GUI may be on a user smartphone, tablet computer, notebook computer, laptop computer, desktop computer, smartwatch, or other GUI equipped computerized device.

FIG. 5 shows a process of executing an SQL select query in an SQL RDB on tables holding GDT-document-node records, then converting at least portions of the returned GDT-document-nodes back into a GDT document.

(410) shows a SQL Select Query. This shows a SQL select query for executing in the specified SQL RDB to retrieve a list of GDT-document-node records.

(405) shows the SQL Relational Database. Here assume that this SQL RDB has already been prepared by executing the specified GDT Relational Schema now able to execute the SQL Insert Query to load GDT-document-node records into SQL RDB table(s). In other words, this SQL RDB has been previously loaded with the SQL versions of the GDTD data.

(407) shows the GDT Document Nodes. This can be a list of the GDT-document-nodes, retrieved by the particular SQL query (410), here delivered in a plain text format, such as JSON format.

(411) shows the GDT Document Node Assembler. This can be a method/process for assembling a list of GDT-document-nodes into all or part of a GDT document. In some embodiments, this GDT document node assembler can operate by receiving JSON formatted data, and use JSON-GDT algorithms (which may be previously stored in system memory), as well as stored information pertaining to the original GDTD document type, to reassemble this JSON formatted data back into the original GDTD format.

(401) shows the reassembled GDT Doc. This can be an instance of a General Data Type document output by the GDT Document Node Assembler (411).

The invention claimed is:

1. A method of storing and retrieving at least portions of General Data Type Documents (GDTD) using Structured Query Language (SQL) Relational Databases (SQL-RDB), said method comprising:

obtaining at least one GDTD formatted according to a General Data Type (GDT);

wherein said GDT comprises any of JavaScript Object Notation (JSON) document data types, markup language document data types, and text document data types;

wherein said General Data Type Document (GDTD) is a stand-alone, self-contained, single data set instance that conforms to at least one of said GDT;

wherein, for at least some of said GDT, a GDT relational schema that specifies how to transform said GDTD into at least one list of GDT-document-nodes and corresponding GTD-document-node records suitable for storage in data tables of said SQL-RDB is either known or can be identified;

wherein said GDT-document-nodes comprise tuples composed of GDT-structure fields and GDT-content-value fields, wherein said GDT-structure fields specify how to assemble lists of said GDT-document-nodes back into said GDTD;

selecting, using at least one computer processor and computer memory, at least one GDT relational schema specifying a mapping between at least one said GDTD and at least one said SQL-RDB;

using said GDT relational schema to convert said GDTD into a corresponding list of GDT-document-node records for insertion into matching schema-defined SQL-RDB tables;

generating and executing SQL select queries or SQL general join-select queries to search for specific sets of GDT-document-node records or joined GDT-document-node records in specific SQL-RDB tables;

returning those selected GDT-document-node records from those SQL-RDB tables that match said SQL select query or SQL general join-select queries;

reassembling said GDT-document-node records into at least portions of said GDTD by using said GDT-document-node records to assemble said selected GDT-document-node records back into at least portions of matching GDTD.

2. The method of claim 1, wherein said GDTD has an internal structure comprising either a document data type with a tree-hierarchical structure or a semi-structured data type with graph, key-value, or other structure;

wherein said GDT-document-nodes further comprise a GDT-structure field, one or more GDT-content-value fields, and zero or more other extended application data fields;

wherein said GDT-structure field specifies how a given child GDT-document-node attaches to its parent GDTD;

wherein said GDT-structure field has a syntax has configured to be an SQL query condition target selected to enable searching for GDT-document-node records by GDT document structure;

wherein said GDT-content-value fields specify GTD-document-node content values;

wherein said GDT-content-value fields are comprised of structural values comprising any of arrays, lists, objects, and other structural values;

wherein said GDT-content-value fields further comprise non-structural scalar values comprising any of strings, numbers, Booleans, integers, datetimes, and other scalar values;

wherein said structural values specify said GDTD internal structure; and wherein said non-structural scalar values capture at least some GDTD content value data types.

3. The method of claim 1 wherein said GDT relational schema uses a matching GDT-document-node definition to specify said GDT-document-node record and said matching SQL-RDB tables that can hold that GDT-document-node record;

wherein said GDT-document-node record is comprised of one non-null integer primary key ID field, one or more GDT-structure fields, one or more GDT-content-value fields, plus zero or more extended application data fields;

wherein said GDT relational schema comprises at least one SQL create table statements that when executed creates one or more GDT relational live tables in a target SQL-RDB instance configured to store said schema defined GDT-document-node records;

wherein said GDT relational schema further comprises at least one SQL create index statement that defines one or more indexes on each defined/created GDT relational live tables;

wherein said GDT relational schema is written/implemented in an SQL dialect of the target SQL RDB instance, which executes a specific said GDT relational schema to install one or more live tables and indexes able to store GDT-document-node records;

wherein the one or more live SQL RDB tables may be searched via SQL select and join-select queries to retrieve sets of GDT-document-node records using both GDT-structure fields and GDT-content-value fields as search condition targets.

4. The method of claim 1 wherein said method further comprises:

reading said GDTD; and automatically converting said GDTD into a set of GDT-document-node records, and using said GDT-documents node records to generate SQL insert statements to insert-write GDT-document-node records into the specific matching SQL-RDB table(s).

5. The method of claim 1, wherein converting said GDT-document-node records further comprises;

executing SQL select and/or join-select queries that retrieve sets of GDT-document-node records; and automatically converting sets of said GDT-document-node records into said GDTD;

outputting either said GDT-document-node records or said GDTD to external applications or web applications; and/or displaying either said GDT-document-node records or said GDTD in a GUI user interface.

6. The method of claim 1, wherein said method further comprises any of:

a) receiving and executing a GDT relational schema document in a specified target SQL RDB to install one or more GDT relational tables in a specified SQL RDB product;

b) to receiving input parameters which direct loading of a specified SQL RDB instance for use, or removal of a specified SQL RDB instance from use;

c) receiving input parameters directing the generation of appropriate SQL query statements to delete specified RDB tables and their GDT-document-node record content from the specified SQL RDB instance;

d) receiving input parameters directing the generation of appropriate SQL query statements to copy specified RDB tables and their GDT-document-node record content from a specified source SQL RDB instance to a specified target SQL RDB instance;

e) receiving input parameters directing the generation of appropriate SQL query statements to copy specified GDT-document-node records from specified source RDB tables in the specified source SQL RDB instance to specified target RDB tables in a specified target SQL RDB instance;

f) receiving, parsing, and converting GDT documents into lists of GDT-document-node records as defined by their matching GDT relational schema;

g) receiving input parameters and lists of GDT-document-nodes, directing the generation of appropriate SQL insert query statements that when executed by the specified SQL RDB instance will insert the list of GDT-document-nodes as GDT-document-node records into the specified RDB table in the specified SQL RDB instance;

h) receiving input search parameters directing the generation of appropriate SQL select query or join-select query statements that when executed by the specified SQL RDB will retrieve a list of GDT-document-node records from the specified RDB tables in the specified SQL RDB instance;

i) transforming lists of GDT-document-node records retrieved from the specified RDB tables in the specified SQL RDB instance into one or more output GDT documents;

j) receiving input parameters and a list of GDT-document-nodes directing the generation of appropriate SQL update query statements that when executed by the specified SQL RDB instance will modify existing GDT-document-node records in the specified RDB table in the specified SQL RDB instance;

k) receiving input parameters directing the generation of appropriate SQL delete query statements that when executed by a specified SQL RDB instance will delete existing GDT-document-node records form the specified RDB table in the specified SQL RDB instance.

7. The method of claim 1, wherein at least one said SQL-RDB is located in one or more memory storage devices in one or more networked computer servers.

8. The method of claim 1, further identifying said GDT relational schema that specifies how to transform said GDTD into at least one list of GDT-document-nodes and corresponding GTD-document-node records by any of:
   a: examining a file extension type of said GDTD, and obtaining a GDT relational schema from memory that corresponds to said file extension type; and/or
   b: examining, using any of pattern recognition methods, statistical analysis, or artificial intelligence, an internal structure of said GDTD, and determining if a GDT relational schema from memory corresponds to said internal structure; and/or
   c: examining, using artificial intelligence methods, said internal structure of said GDTD, and generating an AI obtained GDT relational schema that fits said internal structure.

9. The method of claim 1, further using said GDT relational schema to convert said GDTD into a corresponding list of GDT-document-node records for insertion into matching schema-defined SQL-RDB tables; reading said GDTD by at least emulating a document reading or editing program that operates according to said GDT relational schema, and extracting information from said GDTD to obtain said corresponding list of GDT document node records.

10. The method of claim 1, wherein said GDT relational schema reformats at least some of the GDTD data into an intermediate JSON format; and/or
   further using JSON formatted data to reassemble said GDT-document-node records into at least portions of said GDTD.

11. A system for storing and retrieving at least portions of General Data Type Documents (GDTD) using Structured Query Language (SQL) Relational Databases (SQL-RDB), said system comprising:
   at least one processor and memory;
   said at least one processor and memory configured to run at least one SQL RDB Management Application (SQL-RDBMA);
   said at least one processor configured to obtain at least one GDTD formatted according to a General Data Type (GDT);
   wherein said GDT comprises any of JavaScript Object Notation (JSON) document data types, markup language document data types, text document data types, and other document data types, and said General Data Type Document (GDTD) is a stand-alone, self-contained, single data set instance that conforms to at least one of said GDT;
   wherein, for at least some of said GDT, said memory further comprises, or said processor is configured to obtain, a GDT relational schema that specifies how to transform said GDTD into at least one list of GDT-document-nodes and corresponding GTD-document-node records suitable for storage in data tables of said SQL-RDB;
   wherein said GDT-document-nodes comprise tuples composed of GDT-structure fields and GDT-content-value fields, wherein said GDT-structure fields specify how to assemble lists of said GDT-document-nodes back into GDTD;
   said at least one processor configured to select at least one GDT relational schema specifying a mapping between at least one said GDTD and at least one said SQL-RDB;
   said at least one processor configured to use said GDT relational schema to convert said GDTD into a corresponding list of GDT-document-node records for insertion into matching schema-defined SQL-RDB tables;
   said at least one processor configured to generate and execute SQL select queries or SQL general join-select queries to search for specific sets of GDT-document-node records or joined GDT-document-node records in specific SQL-RDB tables;
   said at least one processor configured to return those selected GDT-document-node records from those SQL-RDB tables that match said SQL select query or SQL general join-select queries;
   said at least one processor configured to reassemble said GDT-document-node records into at least portions of said GDTD by using said GDT-document-node records to assemble said selected GDT-document-node records back into at least portions of matching GDTD.

12. The system of claim 11, wherein said GDTD has an internal structure comprising either a document data type with a tree-hierarchical structure or a semi-structured data type with graph, key-value, or other structure;
   wherein said GDT-document-nodes further comprise a GDT-structure field, one or more GDT-content-value fields, and zero or more other extended application data fields;
   wherein said GDT-structure field specifies how a given child GDT-document-node attaches to its parent GDTD;
   wherein said GDT-structure field has a syntax has configured to be an SQL query condition target selected to enable searching for GDT-document-node records by GDT document structure;
   wherein said GDT-content-value fields specify GTD-document-node content values;
   wherein said GDT-content-value fields are comprised of structural values comprising any of arrays, lists, objects, and other structural values;
   wherein said GDT-content-value fields further comprise non-structural scalar values comprising any of strings, numbers, Booleans, integers, datetimes, and other scalar values;

wherein said structural values specify said GDTD internal structure; and wherein said non-structural scalar values capture at least some GDTD content value data types.

13. The system of claim 11 wherein said GDT relational schema uses a matching GDT-document-node definition to specify said GDT-document-node record and said matching SQL-RDB tables that can hold that GDT-document-node record;

wherein said GDT-document-node record is comprised of one non-null integer primary key ID field, one or more GDT-structure fields, one or more GDT-content-value fields, plus zero or more extended application data fields;

wherein said GDT relational schema comprises at least one SQL create table statements that when executed creates one or more GDT relational live tables in a target SQL-RDB instance configured to store said schema defined GDT-document-node records;

wherein said GDT relational schema further comprises at least one SQL create index statement that defines one or more indexes on each defined/created GDT relational live tables;

wherein said GDT relational schema is written/implemented in an SQL dialect of the target SQL RDB instance, which executes a specific said GDT relational schema to install one or more live tables and indexes able to store GDT-document-node records;

wherein said at least one processor is configured to search said one or more live SQL RDB tables via SQL select and join-select queries to retrieve sets of GDT-document-node records using both GDT-structure fields and GDT-content-value fields as search condition targets.

14. The system of claim 11 wherein said processor is further configured to read said GDTD; and automatically convert said GDTD into a set of GDT-document-node records, and use said GDT-documents node records to generate SQL insert statements to insert-write GDT-document-node records into the specific matching SQL-RDB table(s).

15. The system of claim 11, wherein said at least one processor is further configured to convert said GDT-document-node records by;

executing SQL select and/or join-select queries that retrieve sets of GDT-document-node records; and automatically converting sets of said GDT-document-node records into said GDTD;

outputting either said GDT-document-node records or said GDTD to external applications or web applications; and/or displaying either said GDT-document-node records or said GDTD in a GUI user interface.

16. The system of claim 11, wherein said at least one processor is further configured to perform any of:

a) receiving and executing a GDT relational schema document in a specified target SQL RDB to install one or more GDT relational tables in a specified SQL RDB product;

b) to receiving input parameters which direct loading of a specified SQL RDB instance for use, or removal of a specified SQL RDB instance from use;

c) receiving input parameters directing the generation of appropriate SQL query statements to delete specified RDB tables and their GDT-document-node record content from the specified SQL RDB instance;

d) receiving input parameters directing the generation of appropriate SQL query statements to copy specified RDB tables and their GDT-document-node record content from a specified source SQL RDB instance to a specified target SQL RDB instance;

e) receiving input parameters directing the generation of appropriate SQL query statements to copy specified GDT-document-node records from specified source RDB tables in the specified source SQL RDB instance to specified target RDB tables in a specified target SQL RDB instance;

f) receiving, parsing, and converting GDT documents into lists of GDT-document-node records as defined by their matching GDT relational schema;

g) receiving input parameters and lists of GDT-document-nodes, directing the generation of appropriate SQL insert query statements that when executed by the specified SQL RDB instance will insert the list of GDT-document-nodes as GDT-document-node records into the specified RDB table in the specified SQL RDB instance;

h) receiving input search parameters directing the generation of appropriate SQL select query or join-select query statements that when executed by the specified SQL RDB will retrieve a list of GDT-document-node records from the specified RDB tables in the specified SQL RDB instance;

i) transforming lists of GDT-document-node records retrieved from the specified RDB tables in the specified SQL RDB instance into one or more output GDT documents;

j) receiving input parameters and a list of GDT-document-nodes directing the generation of appropriate SQL update query statements that when executed by the specified SQL RDB instance will modify existing GDT-document-node records in the specified RDB table in the specified SQL RDB instance;

k) receiving input parameters directing the generation of appropriate SQL delete query statements that when executed by a specified SQL RDB instance will delete existing GDT-document-node records from the specified RDB table in the specified SQL RDB instance.

17. The system of claim 11, wherein at least one said SQL RDB is located in one or more memory storage devices in one or more networked computer servers.

18. The system of claim 11, wherein said at least one processor is further configured to identify said GDT relational schema that specifies how to transform said GDTD into at least one list of GDT-document-nodes and corresponding GTD-document-node records by any of:

a: examining a file extension type of said GDTD, and obtaining a GDT relational schema from memory that corresponds to said file extension type; and/or b: examining, using any of pattern recognition methods, statistical analysis, or artificial intelligence, an internal structure of said GDTD, and determining if a GDT relational schema from memory corresponds to said internal structure; and/or c: examining, using artificial intelligence algorithms and/or AI co-processors, said internal structure of said GDTD, and generating an AI obtained GDT relational schema that fits said internal structure.

19. The system of claim 11, wherein said at least one processor is further configured to use said GDT relational schema to convert said GDTD into a corresponding list of GDT-document-node records for insertion into matching schema-defined SQL-RDB tables; and read said GDTD by at least emulating a document reading or editing program that operates according to said GDT relational schema, and extracting information from said GDTD to obtain said corresponding list of GDT document node records.

20. The system of claim 11, wherein said at least one processor uses said GDT relational schema to reformat at least some of the GDTD data into an intermediate JSON format; and/or wherein said at least processor is further configured to use JSON formatted data to reassemble said GDT-document-node records into at least portions of said GDTD.

* * * * *